June 2, 1931. I. KULIK 1,807,850

DENTAL PLATES SUCTION CUP ATTACHING MEANS

Filed Oct. 23, 1926

INVENTOR.
Irving Kulik

Patented June 2, 1931

1,807,850

UNITED STATES PATENT OFFICE

IRVING KULIK, OF BROOKLYN, NEW YORK

DENTAL PLATE SUCTION CUP ATTACHING MEANS

Application filed October 23, 1926. Serial No. 143,702.

This invention relates generally to dental plates and is more particularly directed to a new suction cup attaching means and the quick and accurate attachment thereof in the process of construction of said dental plates.

Figure 5:
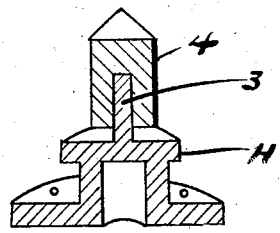

Fig. 5 also shows the invention partly in section and partly in perspective.

Referring to the drawings numeral 3 is a triangular stem (triangular in cross section) fitting into a corresponding triangular tube 4. Said stem 3 extends below the head H. Reference in this paragraph is made to Fig. 4.

Referring to the drawings numeral 3, Fig. 5, is a triangular stem (triangular in cross section) extending above the head H and fitting into a corresponding triangular tube 4.

Figure 1:
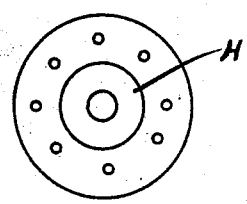
Fig. 1 shows the upper surface of the invention.
Figure 2:
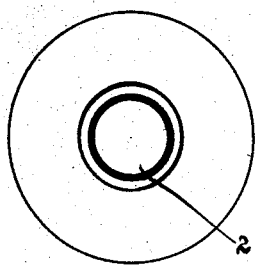
Fig. 2 shows the soft rubber which when unmounted is flat and that fits over the head of H of Fig. 1 with the hole 2 of Fig. 2 fitting over said head H of Fig. 1.
Figure 3:
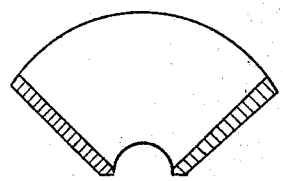
Fig. 3 shows how the soft rubber of Fig. 2 assumes the cup like shape Fig. 3 when the soft rubber of Fig. 2 is positioned over the head H of Fig. 1, and is shown partly in section and partly in perspective.
Figure 4:
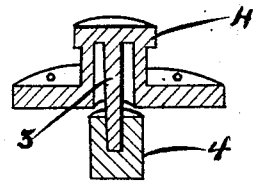
Fig. 4 shows the invention partly in section and partly in perspective.

In order to construct a dental plate, my device Fig. 4 with the surface shown in Fig. 1 is burnished over the palatal or alveolar surface of a casting which is obtained from pouring a so-called dental impression. The stem 3 and tube 4 is thus seen with its free end extending upwards. After the usual waxing preparatory to vulcanizing the dental plate the stem 3 with its enveloping tube 4 remains with its free end extending from the wax.

After the flasking is accomplished, and after the separating of the two halves of the flask for the packing of rubber, my device appears held to the female half of the flask. The packing is then done in the female half of the flask as usual. Then the usual testing is done to determine if sufficient rubber has been packed. During this packing my device is removed from the female half of the flask with the tube 4 left in the plaster and a plug inserted therein to prevent material from entering said tube. After the required packing the mentioned plug is removed from the tube 4 and by perforating the soft rubber with the stem 3, and pressing the rubber away from underneath, thus replacing the suction holding device correctly within the tube 4, the flask is closed ready for vulcanizing without fearing that the suction cup holding device will move away from a desired position with the disastrous results heretofore encountered and eliminating the cementing, nailing, etc., in ineffectual attempts to prevent said movement.

By drilling a hole into a cast of an impression my device can be attached through the insertion of the tube 4, into said hole, and the remainder of the suction cup attaching device finally attached through the stem 3. This is of value where metallic casting is done and where one wants to be sure that the suction cup retaining means will not move in the mould in the process of casting. Fig. 5 is the form of my device which I have reference to in this paragraph. Hitherto the employment of a suction cup with cast metal dentures required a construction fraught with considerable difficulties. The parts 3 and 4 of the suction cup retaining means overcomes all these difficulties.

My device can be used without the tube 4 by threading the stem 3 to aid in the removal of the suction cup retaining means or the stem 3 can be left smooth, to be pulled out and replaced directly in its enfolding investment material. The flange below the head H has a multiplicity of perforations which appear as circles in the drawings Figs. 4 and 5.

What I claim as new and wish to secure by Letters Patent is:

1. A dental plate suction cup attaching means and a rubber cup therefor comprising a flexible rubber cup and a holding element therefor with which said rubber cup is associated, a stem extending from said holding element to retain said holding element in position in moulds during the process of construction of a dental plate or base for a dental plate and a tube into which the said stem of the said holding element fits into.

2. An article of manufacture for use with artificial dentures consisting of a disc having thickness and two surfaces, extending upright from one surface of which disc is a constricted neck and a head upon said neck and extending from said head is a stem.

3. An article of manufacture for use with artificial dentures consisting of a disc having thickness and two surfaces, extending upright from one surface of which disc is a constricted neck and a head upon said neck, and below the other surface of said disc is a stem.

4. An article of manufacture for use with artificial dentures consisting of a disc having thickness and two surfaces, extending upright from one surface of which disc is a constricted neck and head upon said neck, and below the other surface of said disc is a stem, all of which is formed from a unitary piece of material.

5. An article of manufacture for use with artificial dentures consisting of a disc having thickness and two surfaces, extending upright from one surface of which disc is a constricted neck and head upon said neck, and below the other surface of said disc is a stem, said stem being longer than is the head and neck on the opposite side of said disc.

6. An article of manufacture for use with artificial dentures consisting of a disc having thickness and two surfaces, extending upright from one surface of which disc is a constricted neck and head upon said neck, and below the other surface of said disc is a stem, said disc maintaining immovably fixed its head and neck on one side and its stem on the other side from the time the said article is manufactured.

7. An article of manufacture for use with artificial dentures consisting of a disc having thickness and two surfaces, extending upright from one surface of which disc is a constricted neck and a head upon said neck, and below the other surface of said disc is a stem, said stem being narrower than is the neck on the opposite side of said disc.

8. An article of manufacture for use with artificial dentures consisting of a disc having thickness and two surfaces, a stem below a surface of said disc and a tube movable with respect to the walls of said stem.

9. In the art of dentistry the method which consists of constructing an artificial denture by use of a model and anchoring into the model a stem of a suction cup attaching means, which cup is employed for holding an artificial denture in the mouth by suction, and thereafter completing the construction of the denture and making the said suction cup attaching means a part of the said denture.

10. A denture suction cup attaching means consisting of a flat disc, a head and neck for holding a suction cup to one side of said disc and a stem on the other side of the said disc, which stem is used for holding the said suction cup attaching means to a model during the construction of a denture.

11. A denture suction cup attaching means consisting of a flat disc, a head and neck for holding a suction cup on one side of said disc, and an elongated stem on the other side of said disc, which stem normally extends completely through and beyond the base of a denture before it is completed.

IRVING KULIK.